Dec. 15, 1964     C. M. HALVERSON     3,161,435
LEG SUPPORT FOR AUTOMOTIVE VEHICLE OPERATORS
Filed March 22, 1962
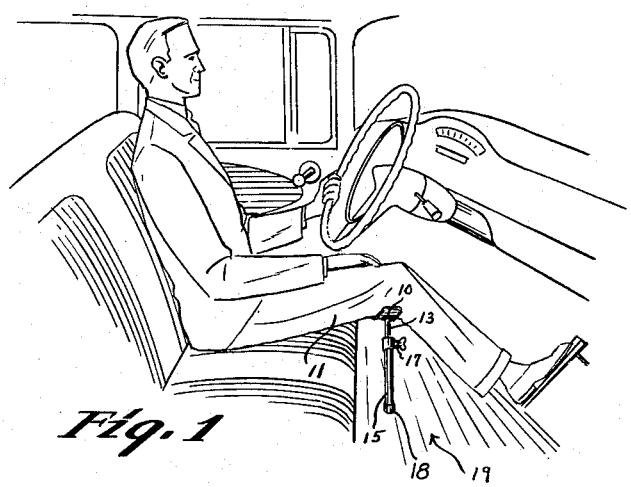
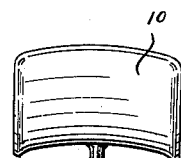
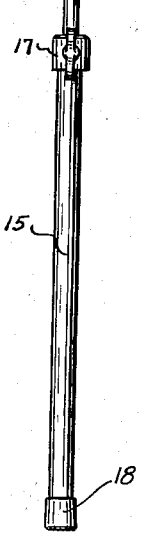
INVENTOR.
CLYDE M. HALVERSON
BY
Talbert Dick & Darley
ATTORNEYS
WITNESS
NORMAN G. TRAVISS

United States Patent Office 3,161,435
Patented Dec. 15, 1964

3,161,435
LEG SUPPORT FOR AUTOMOTIVE
VEHICLE OPERATORS
Clyde M. Halverson, 2625 5th Ave. S., Fort Dodge, Iowa
Filed Mar. 22, 1962, Ser. No. 181,623
3 Claims. (Cl. 297—437)

This invention relates to an automotive vehicle operator's aid, and more particularly to a leg supporting means.

The operating of powered vehicles for long trips can be very tedious, exhausting and even painful. The problem is usually confined to the leg that actuates the accelerator pedal. Quite often the muscles of the leg get so cramped and rigid as to produce an almost unbearable pain. Even if leg cramps do not develop, the continued suspended non-moving position of the leg affects its lateral control. This result in undesirable trembling or quavering of the leg and a feeling of muscle control weakness. Such problems are not only that of the driver or operator, but are dangerous to life and property.

Therefore one of the principal objects of my invention is to provide a vehicle operator's leg support that not only stabilizes and supports the operator's leg that actuates the vehicle accelerator pedal, but eliminates leg tension, leg cramps, and leg fatigue.

A further object of this invention is to provide a vehicle driver's leg support that may be easily and quickly adjusted to various desired heights.

A still further object of this invention is to provide a leg support for automotive vehicle drivers that will successfully fit legs of different sizes.

A still further object of this invention is to provide a vehicle driver's leg support means that is adjustable as to position longitudinally of the leg being supported.

Still further objects of my invention are to provide a leg support for automotive vehicle operators that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective view of my device in use;

FIG. 2 is an enlarged side view of my leg support;

FIG. 3 is an enlarged side view of the upper portion of the device; and

FIG. 4 is an enlarged perspective view of the vertical adjusting means.

A viewing of the drawings discloses that my device is not a part of nor is it attached to the vehicle. The upper portion of the device is in the form of a U-shaped open cradle 10. This cradle may be formed of strap metal, plastic, fibre glass, or like. Obviously this U-shaped cradle 10 is for receiving and supporting the leg 11 of the vehicle driver, as shown in FIG. 1. For comfort the inside of the strap cradle 10 should have its width convex as shown. Also, its upper end portion may be slightly outwardly flared. Secured to and extending downwardly from the bottom center of the cradle 10 is a vertical rod or like post 13. The length of this post 13 adjustably slidably telescopes in the foot tube 15. The upper end portion of this tube 15 has longitudinal slots 16. Embracing the upper slitted end of the tube 15 is an ordinary screw clamp means 17. The upper end of the clamp means is provided with a radially inwardly extending peripheral shoulder 20, which overlaps the top rim of the tube to prevent it from sliding downwardly thereon. The post 13 and tube 15 form the leg of the device. To adjust the length of this leg construction, the clamp 17 is first loosened by withdrawing a threaded wingbolt 21 in engagement in a threaded opening in the side of the clamp 17. This permits the sliding of the tube upwardly or downwardly on the post. When the desired leg length is obtained, the clamp means 17 is tightened, thereby collapsing the upper slitted end of the tube into rigid frictional engagement onto the post. To use the device it is merely necessary to place the U-shaped saddle 10 under the leg at an adjustable position between the vehicle seat and knee. The lower end of the tube 15 is provided with a cap element 18 of rubber or the like for engagement with the vehicle floor 19, thereby vertically supporting the driver's leg back of the knee. If desired, the post and tube may be placed to extend downwardly and laterally outwardly to give outside lateral support to the leg of the driver. The use of my device does not interfere with the actuation of the accelerator pedal. It does, however, give the desired required support to the driver's leg and by its use leg strains, cramps, and leg trembling due to fatigue are eliminated.

Some changes may be made in the construction and arrangement of my leg support for automotive vehicle operators without departing from the real spirit and purpose of my invention, and it is my intention to cover by my claims, any modified forms of structure or use of mechanical equivalents which may be reasonably included within their scope.

I claim:

1. In an automotive driver's leg support unit, comprising, an open U-shaped leg engaging cradle;

a first member secured at one end to the bottom of said cradle, the other end of said first member telescopically engaging a second member, said second member having a cap element provided on its free end and adapted to only frictionally engage the floor of an automobile;

said leg unit being separate from said automobile floor and engaging said floor only through said cap element on said second member and said support unit being maintained in an upright position by engagement with an automobile driver's leg;

and a means for selectively locking said telescoping first and second members thereby limiting relative longitudinal movement therebetween.

2. In an automotive vehicle driver's leg support, comprising, an open U-shaped leg engaging cradle, a post extending downwardly from said leg engaging cradle, a tube slidably embracing said post, longitudinal slots in the upper end portion of said tube, and a clamp tightening means embracing the upper end portion of said tube, said clamp having a radially inwardly extending peripheral shoulder at one end adapted to engage the adjacent end edge of said upper end portion of said tube, said clamp having a threaded opening in the side thereof, a threaded bolt provided in said opening and adapted to adjustably bear against said upper end portion of said tube having the longitudinal slots, and the outer end of said bolt being provided with a hand gripping means for rotating said bolt.

3. The structure of claim 2 and a cap element is provided on the free end of said tube for engagement with the floor of an automobile.

References Cited in the file of this patent
UNITED STATES PATENTS

| | | |
|---|---|---|
| 1,890,423 | Teagarden | Dec. 6, 1932 |
| 2,229,789 | Arndt et al. | Jan. 28, 1941 |
| 2,473,947 | Hamstrom | June 21, 1949 |
| 2,649,142 | New | Aug. 18, 1953 |
| 2,732,269 | Astroff | Jan. 24, 1956 |
| 2,749,973 | Leasy | June 12, 1956 |
| 2,818,577 | Kubik et al. | Jan. 7, 1958 |
| 2,994,152 | Donahue | Aug. 1, 1961 |